United States Patent
Shioda et al.

(10) Patent No.: US 11,899,552 B2
(45) Date of Patent: Feb. 13, 2024

(54) ESTIMATION DEVICE, ESTIMATION METHOD AND ESTIMATION PROGRAM

(71) Applicant: NIPPON TELEGRAPH AND TELEPHONE CORPORATION, Tokyo (JP)

(72) Inventors: Tetsuya Shioda, Musashino (JP); Miki Sakai, Musashino (JP); Kazuki Oikawa, Musashino (JP); Masakuni Ishii, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 193 days.

(21) Appl. No.: 17/609,000

(22) PCT Filed: May 9, 2019

(86) PCT No.: PCT/JP2019/018535
§ 371 (c)(1),
(2) Date: Nov. 5, 2021

(87) PCT Pub. No.: WO2020/225901
PCT Pub. Date: Nov. 12, 2020

(65) Prior Publication Data
US 2022/0214956 A1    Jul. 7, 2022

(51) Int. Cl.
*G06F 11/30* (2006.01)
*G06F 17/18* (2006.01)

(52) U.S. Cl.
CPC .......... *G06F 11/3075* (2013.01); *G06F 17/18* (2013.01)

(58) Field of Classification Search
CPC ............................ G06F 11/3065; G06F 17/18
USPC .......................................................... 709/224
See application file for complete search history.

(56) References Cited

U.S. PATENT DOCUMENTS

| | | | |
|---|---|---|---|
| 7,976,466 B2* | 7/2011 | Ward | A61B 5/1486 600/365 |
| 2014/0215082 A1* | 7/2014 | Backholm | H04L 65/1069 709/227 |
| 2014/0321448 A1* | 10/2014 | Backholm | H04L 43/10 370/338 |
| 2016/0133147 A1* | 5/2016 | Deane | G09B 7/02 434/353 |
| 2017/0364851 A1* | 12/2017 | Maheshwari | G06Q 10/06314 |
| 2020/0085330 A1* | 3/2020 | Di Poian | A61B 5/318 |

FOREIGN PATENT DOCUMENTS

JP    H11128185 A   *   5/1999

OTHER PUBLICATIONS

"Traces—Traces 0.4.2 documentation", Available Online at: https://traces.readthedocs.io/en/latest/, 2016, pp. 1-4.
"Unevenly Spaced Data", Available Online at: https://datascopeanalytics.com/blog/unevenly-spaced-time-series/, Sep. 26, 2016, pp. 1-11.

* cited by examiner

Primary Examiner — Ruolei Zong
(74) Attorney, Agent, or Firm — XSENSUS LLP (57) ABSTRACT

An estimating device includes processing circuitry configured to estimate a median of intervals between adjacent data pieces in input time-series data as a uniform interval for the time-series data, and extract data pieces at the estimated uniform intervals from the input time-series data.

8 Claims, 6 Drawing Sheets

ESTIMATION DEVICE, ESTIMATION METHOD AND ESTIMATION PROGRAM

CROSS-REFERENCE TO RELATED APPLICATION

The present application is based on PCT filing PCT/JP2019/018535, filed May 9, 2019, the entire contents of which are incorporated herein by reference.

TECHNICAL FIELD

The present invention relates to an estimating device, an estimating method, and an estimating program.

BACKGROUND ART

According to conventional approaches, algorithms such as machine learning and statistical methods can be applied to time-series data observed at regular intervals in time order, so that knowledge about past events can be acquired and predictions for the future can be made.

It is assumed that an algorithm for time-series data allows data to be obtained at equal intervals, and if the data is not spaced at equal intervals, missing values are supplemented with imputation values for correction so that the data is arranged at equal intervals. The interval of time-series data should be estimated properly because it cannot be known where data is missing if the data interval is unknown.

For example, Non Patent Literature 1 and Non Patent Literature 2 describe technique about prediction of future data for time-series data which is not spaced at equal intervals.

CITATION LIST

Non Patent Literature

[Non Patent Literature 1] "traces-traces 0.4.2 documentation", [online], 2016, [retrieved Mar. 29, 2019], retrieved from the Internet: <URL:https://traces.readthedocs.io/en/latest/>
[Non Patent Literature 2] "Unevenly Spaced Data", [online], September 2016, IDEO, [retrieved Mar. 29, 2019], retrieved from the Internet: <URL:https://datascopeanalytics.com/blog/unevenly-spaced-time-series/>

SUMMARY OF THE INVENTION

Technical Problem

However, the conventional approaches may have difficulty in properly estimating the interval of time-series data. For example, if missing values exist in time-series data like missing teeth, multiple intervals can be defined between data pieces. Using a narrow interval among the intervals, future data may be predicted with finer granularity, but the prediction accuracy may be significantly lowered because of an increased number of imputation values in past data. Meanwhile, when a wider interval is selected assuming that redundancy values are present, future data can be predicted with high accuracy since less missing values should be imputed by imputation values, but the prediction granularity may be coarse.

With the foregoing in view, it is an object of the present invention to properly estimate the interval of time-series data.

Means for Solving the Problem

In order to solve the problem and achieve the object, an estimating device according to the present invention includes processing circuitry configured to estimate the median of the intervals between adjacent data pieces in input time series data as a uniform interval for the time-series data, and extract data pieces at the estimated uniform intervals from the input time-series data.

Effects of the Invention

According to the present invention, the interval of time-series data can be properly estimated.

DESCRIPTION OF EMBODIMENTS

Hereinafter, one embodiment of the present invention will be described in detail with reference to the drawings. Note that the present invention is not limited by the embodiment. In the drawings, the same portions are designated with the same reference characters.

Configuration of Estimating Device

Figure 1:
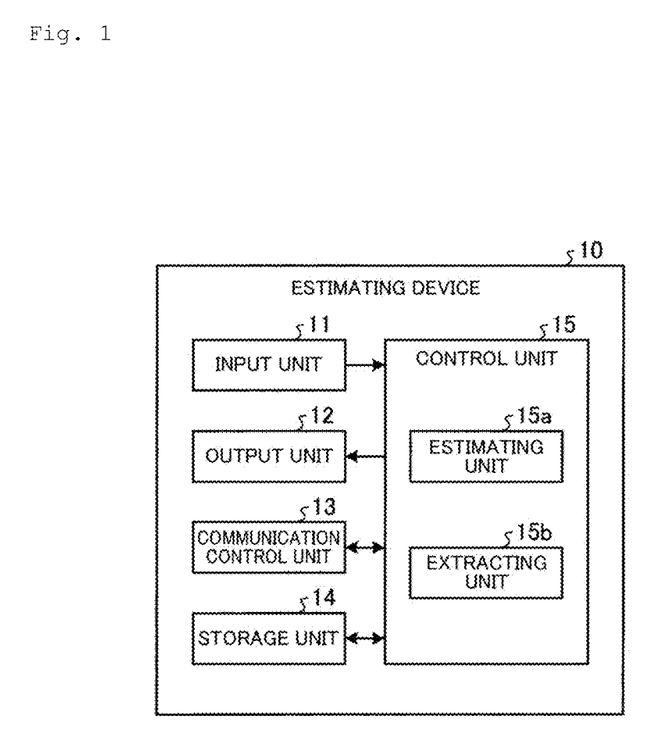
FIG. 1 is a schematic diagram of a general configuration of an estimating device according to an embodiment of the present invention.

FIG. 1 is a schematic diagram of a general configuration of an estimating device according to the embodiment. As illustrated in FIG. 1, the estimating device 10 according to the embodiment is implemented by a general-purpose computer such as a personal computer and includes an input unit 11, an output unit 12, a communication control unit 13, a storage unit 14, and a control unit 15.

The input unit 11 is implemented by an input device such as a keyboard and a mouse device and inputs various kinds of instruction information such as the start of processing to the control unit 15 in response to input operation by an operator. The output unit 12 is implemented for example by a display device such as a liquid crystal display and a printing device such as a printer. For example, the output unit 12 indicates a result of estimating processing which will be described.

The communication control unit 13 is implemented for example by an NIC (Network Interface Card) and controls communication between an external device and the control unit 15 over a telecommunication line such as a LAN (Local Area Network) and the Internet. For example, the communication control unit 13 controls communication between a management device which manages time-series data and the control unit 15.

The storage unit 14 is implemented by a semiconductor memory device such as a RAM (Random Access Memory)

and a flash memory or a storage device such as a hard disk and an optical disk. The storage unit 14 stores a processing program which causes the estimating device 10 to operate or data to be used during execution of the processing program previously or temporarily each time processing is performed. The storage unit 14 may be configured to communicate with the control unit 15 through the communication control unit 13.

For example, the storage unit 14 may store time-series data to be subjected to estimating processing which will be described. In this case, the time-series data is collected for example from the management device which manages time-series data and stored in the storage unit 14 before estimating processing which will be described.

Referring back to FIG. 1, the control unit 15 is implemented for example by a CPU (Central Processing Unit) and executes the processing program stored in the memory. In this way, the control unit 15 functions as an estimating unit 15a and an extracting unit 15b as illustrated in FIG. 1. These functional units may be implemented in different hardware. The control unit 15 may also include other functional units.

The estimating unit 15a estimates the median of intervals between adjacent data pieces in input time-series data as a uniform interval for the time-series data. Specifically, the estimating unit 15a first accepts input of time-series data to be processed through the input unit 11 or the communication control unit 13. When the time-series data is collected in advance and stored in the storage unit 14, the estimating unit 15a obtains the time-series data to be processed by referring to the storage unit 14.

The estimating unit 15a estimates the interval of the time-series data to be processed. Specifically, the estimating unit 15a extracts time intervals between data pieces which constitute the time-series data, specifies the median of the interval values, and estimates the specified median as a uniform interval for the time-series data. In this way, the estimating unit 15a can properly estimate a plausible interval as the interval of the time-series data.

Figure 2:
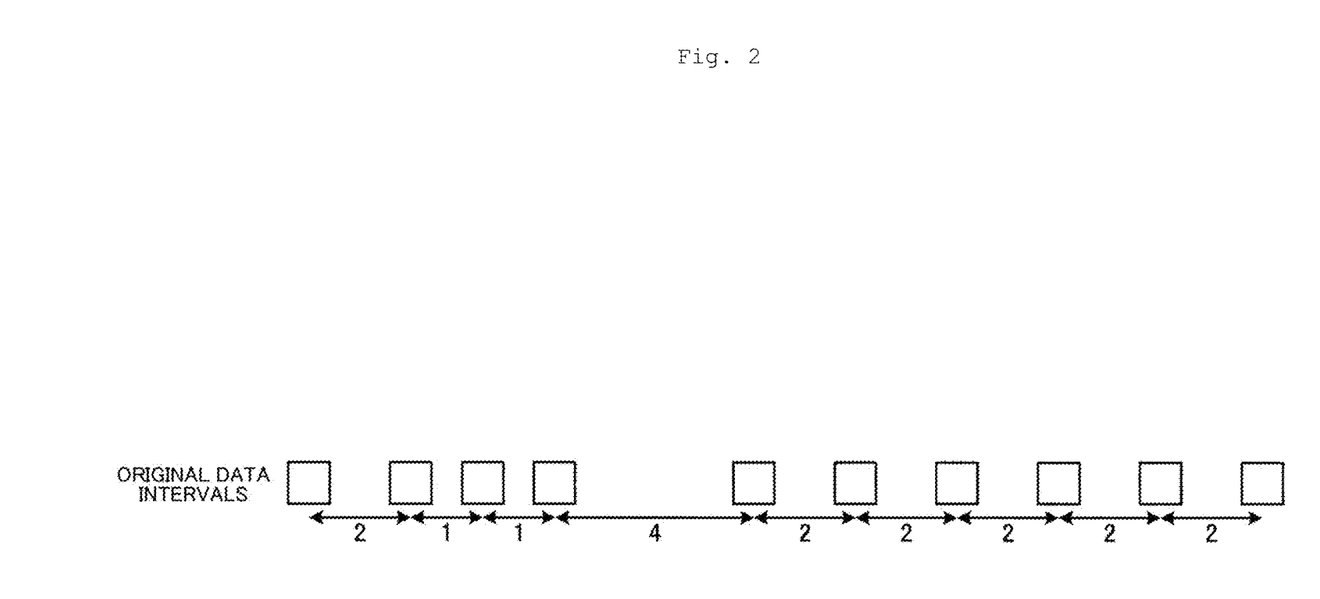
FIG. 2 is a diagram for illustrating processing carried out by an estimating unit.

For example, FIG. 2 is a diagram for illustrating the processing carried out by the estimating unit 15a. In the example shown in FIG. 2, two "1s", six "2s", and one "4" are extracted as interval values. In this case, the median is the fifth interval value "2" which is the middle value of the nine interval values. Therefore, in the example shown in FIG. 2, the estimating unit 15a estimates that the interval of the time-series data is "2".

Referring back to FIG. 1, the extracting unit 15b extracts data pieces at estimated uniform intervals from input time-series data. Here, FIGS. 3 and 4 are diagrams for illustrating the processing carried out by the extracting unit 15b.

Figure 3:
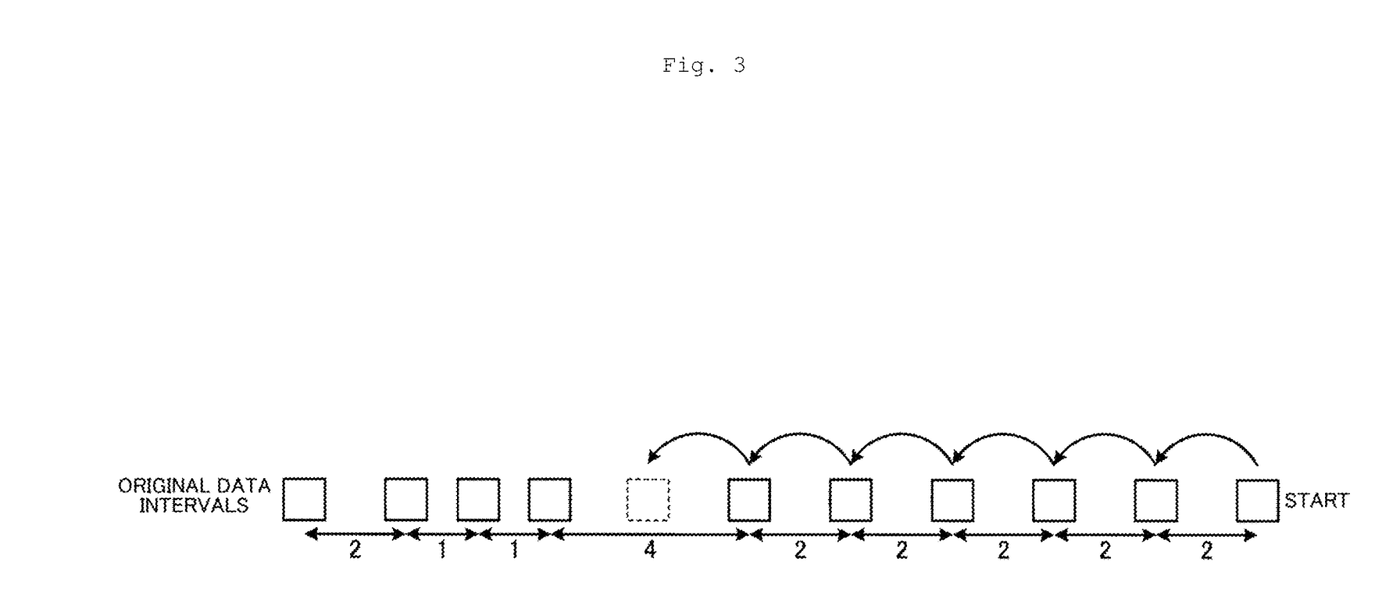
FIG. 3 is a diagram for illustrating processing carried out by an extracting unit.
Figure 4:
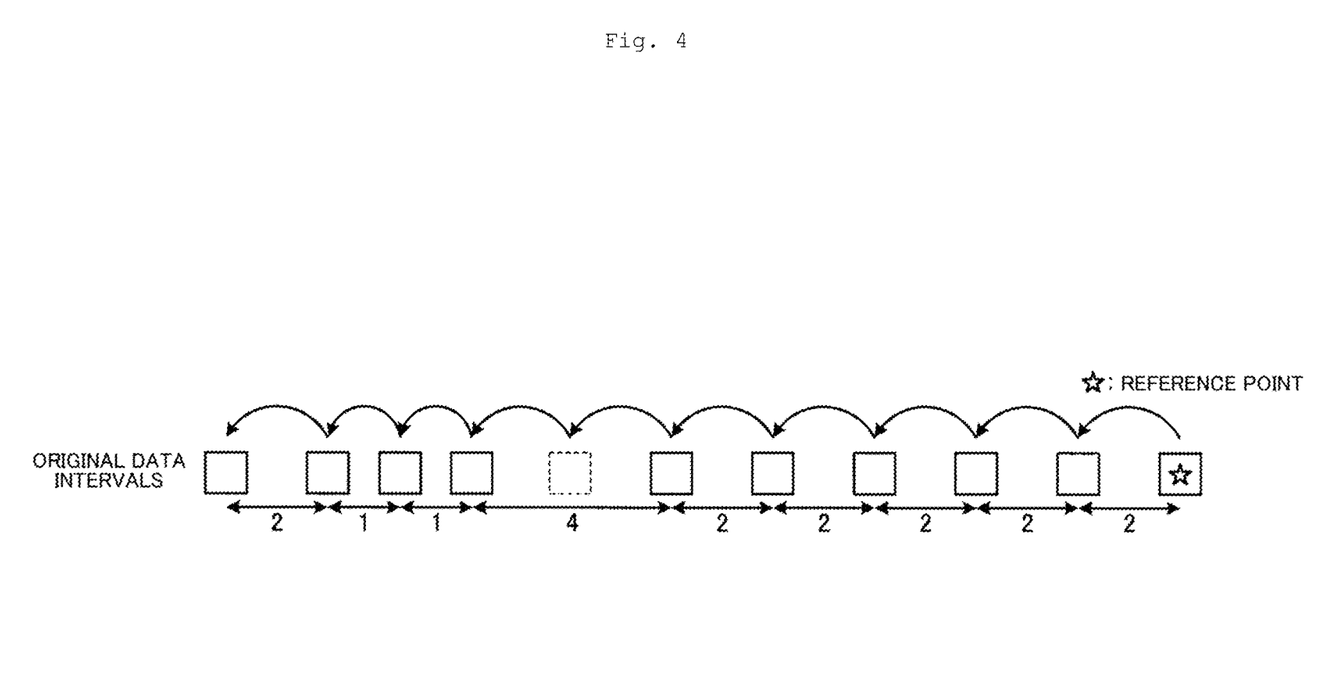
FIG. 4 is a diagram for illustrating processing carried out by the extracting unit.

For example, as shown in FIG. 3, the extracting unit 15b extracts data pieces at time points reached by going back at the estimated uniform intervals in order from the latest data piece of the time-series data. In the example in FIG. 3, the extracting unit 15b extracts data pieces existing at time points reached by going back at estimated intervals of "2" from the latest data piece of the time-series data at the rightmost end. Then, when there is no data piece to extract, the extracting unit 15b ends the processing.

Here, the extracting unit 15b extracts data pieces which exist at time points reached by going back at the estimated intervals×$(1+\varepsilon)$ where $\varepsilon$ is a predetermined tolerance ratio.

In the example in FIG. 3, the extracting unit 15b ends the processing at the time point six intervals behind because no data piece exists. In this manner, in the example shown in FIG. 3, the extracting unit 15b extracts the time-series data including the six data pieces arranged in a time series at intervals of "2". Therefore, the extracting unit 15b can extract the time-series data without a missing value from the input time-series data. Using the time series extracted in this way, future data can be predicted with high accuracy.

Alternatively, as shown in FIG. 4, the extracting unit 15b may extract data pieces which exist at time points reached by going back or advancing at the estimated uniform intervals in order from the time point of each data piece as a reference point in the time series data when the number of the data pieces becomes maximum.

The extracting unit 15b first selects a reference point. In the example shown in FIG. 4, the extracting unit 15b selects, as the reference point, the time point of the latest data piece of the time series data indicated by the star mark. The extracting unit 15b counts the number of data pieces existing at the time points reached by going back at the estimated intervals in order from the selected reference point. Again, the extracting unit 15b counts the number of data pieces existing at the time points reached by going back at the estimated intervals×$(1+\varepsilon)$ where $\varepsilon$ is the predetermined tolerance ratio.

In the example shown in FIG. 4, the extracting unit 15b counts the number "9" of the nine data pieces arranged in a time series at intervals of "2" except for the missing value indicated by a broken line square in the figure.

The extracting unit 15b also counts the number of data pieces existing at the time points reached by going back or advancing at the estimated intervals in order from the reference point in a similar manner while changing the reference point. The extracting unit 15b counts the number of data pieces existing at the estimated intervals for all the reference points and selects a reference point which allows the number of data pieces to be maximized. Then, the extracting unit 15b extracts data pieces existing at the estimated intervals from the selected reference point.

The extracting unit 15b may output the estimated interval and the extracted time-series data to the output unit 12 or output the data for example to the management device through the communication control unit 13.

Note that the interval for going back/advancing from the reference point is not limited to the interval estimated by the estimating unit 15a and may be arbitrarily set. The extracting unit 15b can extract time-series data with less missing values from input time-series data for the interval set here.

In this way, the extracting unit 15b can extract time-series data with the minimum missing ratio from input time-series data. Using the time-series data extracted in this way, future data can be predicted with high accuracy.

When the sum of the time periods of data pieces existing with respect to each reference point becomes maximum, the extracting unit 15b may extract the existing data pieces. For example, when there are multiple reference points for which the number of data pieces existing at estimated intervals becomes maximum, the extracting unit 15b selects a reference point which allows the sum of the time periods of data pieces to be greater and the data pieces to include the most recent data piece. In this way, the extracting unit 15b can extract the latest time-series data.

Estimating Processing

Figure 5:
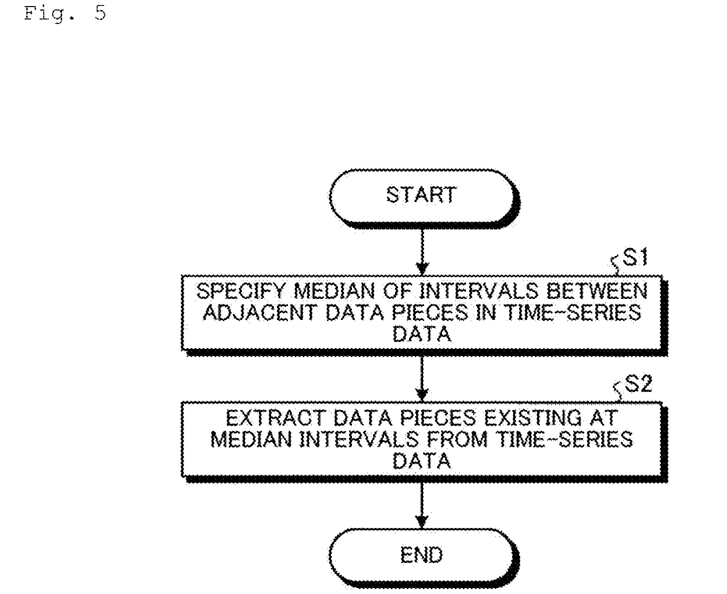
FIG. 5 is a flowchart for illustrating an estimating processing procedure.

The estimating processing by the estimating device 10 according to the embodiment will be described with reference to FIG. 5. FIG. 5 is a flowchart for illustrating the estimating processing procedure. The flowchart in FIG. 5 starts for example at the timing when the user makes operation input to instruct the start.

The estimating unit 15a first specifies the median of the intervals between adjacent data pieces in input time-series data and estimates the specified median as the interval of the time-series data (step S1).

Then, the extracting unit 15b extracts data pieces existing at the estimated median intervals from the input time-series data (step S2).

For example, the extracting unit 15b extracts data pieces at the time points reached by going back at the estimated uniform intervals in order from the latest data of the time-series data. In this case, the extracting unit 15b extracts data pieces existing at the time points reached by going back at the estimated intervals×(1+ε) where ε is a predetermined tolerance ratio.

Alternatively, when the time point of each data piece in the time-series data is used a reference point, and the number of data pieces existing in order from the reference point to the time point reached by going back or advancing at the estimated uniform intervals becomes maximum, the existing data pieces are extracted. When the sum of the time periods of data pieces existing with respect to the reference point becomes maximum, the extracting unit 15b further may be configured to extract the existing data pieces. Again, the extracting unit 15b extracts data pieces which exist at time points reached by going back at the estimated intervals×(1+ε) where ε is the predetermined tolerance ratio. This completes the series of estimating processing steps.

As described above, in the estimating device 10 according to the embodiment, the estimating unit 15a estimates the median of the intervals between adjacent data pieces in the input time-series data as a uniform interval for the time-series data. The extracting unit 15b extracts data pieces at the estimated uniform intervals from the input time-series data.

This allows the estimating device 10 to estimate appropriate intervals with less missing values from input time-series data and extract time-series data. Using the time-series data extracted in this way, future data can be predicted with high accuracy. In this manner, the estimating device 10 can properly estimate the interval of the time-series data.

For example, the extracting unit 15b extracts data pieces at time points reached by going back at the estimated uniform intervals in order from the latest data piece of time-series data. This allows the estimating device 10 to extract time-series data without missing values from the input time-series data and predict future data with high accuracy.

When the time point of each data piece in time-series data is used as a reference point, and the number of data pieces existing at time points reached by going back or advancing at estimated uniform intervals in order from the reference point becomes maximum, the existing data pieces may be extracted. This allows the estimating device 10 to extract the time series data with the smallest missing ratio from the input time series data and to predict future data with high accuracy.

When the sum of the time periods of data pieces existing with respect to the reference point becomes maximum, the extracting unit 15b may extract the existing data pieces. This allows the estimating device 10 to extract the latest time series data from the input time-series data and to predict future data with even higher accuracy.

Program

The processing executed by the estimating device 10 according to the embodiment can also be created into a program which describes the processing in a computer-executable language. According to one embodiment, the estimating device 10 may be implemented by installing, on a desired computer, an estimating program for executing the above-described estimating processing as package software or on-line software. For example, when an information processing apparatus may be caused to execute the estimating program described above, the information processing apparatus can function as the estimating device 10. The information processing apparatus as used here includes a desktop or notebook personal computer. Alternatively, the information processing apparatus includes a mobile communication terminal such as a smartphone and a PHS (Personal Handyphone System) and a slate terminal such as a PDA (Personal Digital Assistant). The function of the estimating device 10 may also be implemented in a cloud server.

Figure 6:
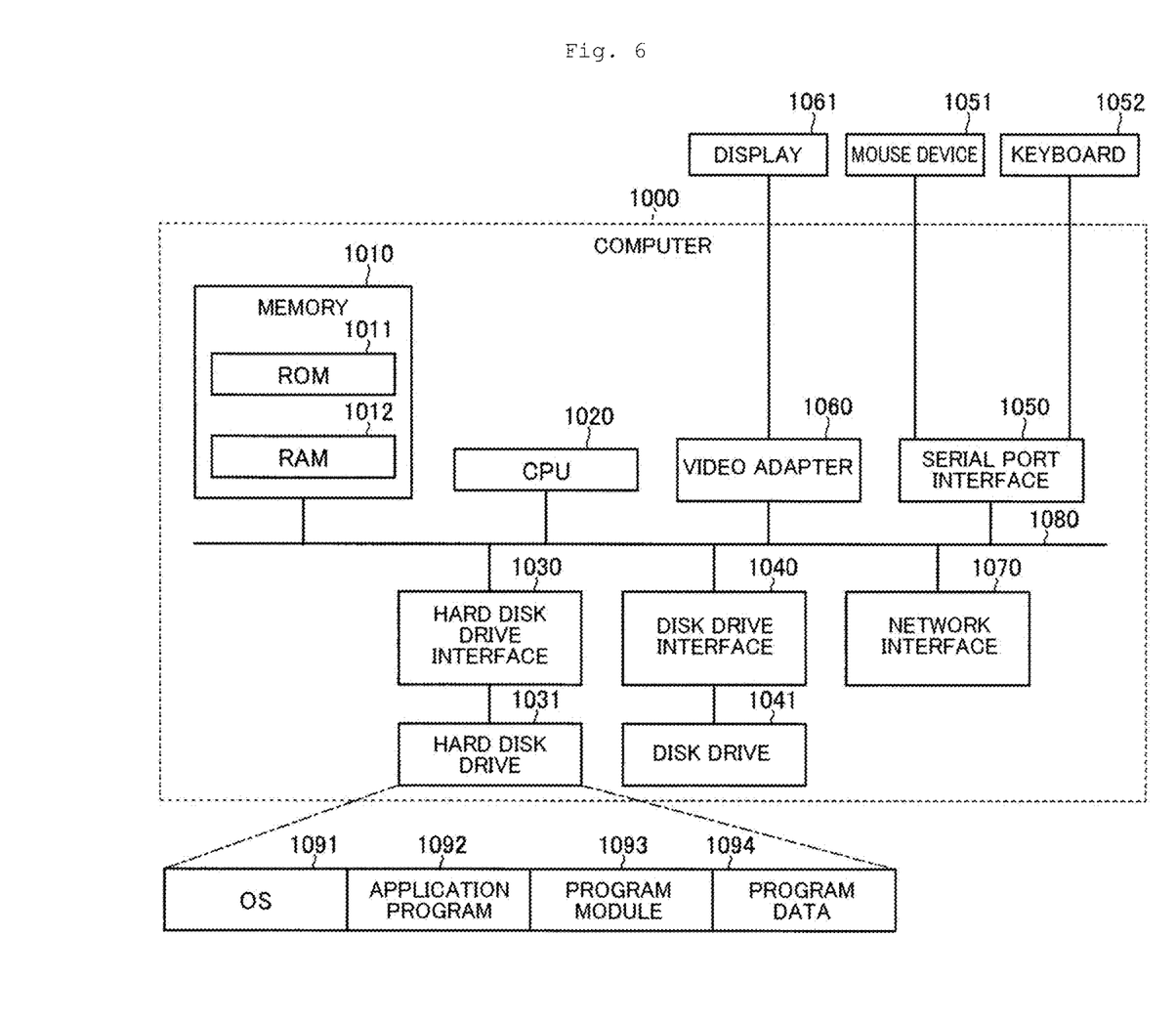
FIG. 6 is a diagram of an exemplary computer which executes an estimating program.

FIG. 6 is a diagram of an exemplary computer which executes the estimating program. The computer 1000 for example has a memory 1010, a CPU 1020, a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores for example a boot program such as BIOS (Basic Input Output System). The hard disk drive interface 1030 is connected to the hard disk drive 1031. The disk drive interface 1040 is connected to the disk drive 1041. For example, a removable storage medium such as a magnetic disk or an optical disk is inserted into the disk drive 1041. The serial port interface 1050 is connected for example to a mouse device 1051 and a keyboard 1052. For example, a display 1061 is connected to the video adapter 1060.

Here, the hard disk drive 1031 stores for example an OS 1091, an application program 1092, a program module 1093, and program data 1094. The various kinds of information in the above description of the embodiment are stored for example in the hard disk drive 1031 or the memory 1010.

The estimating program is also stored in the hard disk drive 1031 for example as the program module 1093 which describes commands to be executed by the computer 1000. Specifically, the program module 1093 which describes various kinds of processing to be executed by the estimating device 10 in the above description of the embodiment is stored in the hard disk drive 1031.

Data used for information processing by the estimating program is stored for example in the hard disk drive 1031 as the program data 1094. Then, the CPU 1020 reads out the program module 1093 and the program data 1094 stored in the hard disk drive 1031 into the RAM 1012 as required and executes the above-described procedures.

Note that the program module 1093 and the program data 1094 related to the estimating program are not necessarily stored in the hard disk drive 1031 but may be stored in a removable storage medium and read out by the CPU 1020 through the disk drive 1041. Alternatively, the program module 1093 and the program data 1094 related to the estimating program may be stored in another computer connected over a network such as a LAN or a WAN (Wide Area Network) and read out by the CPU 1020 through the network interface 1070.

Although the embodiments to which the invention made by the present inventors is applied have been described, the invention is not limited by the description and drawings which constitute part of the disclosure of the invention according to the embodiments. In other words, all other embodiments, examples, operation techniques, and other features made for example by the person skilled in the art on the basis of the embodiments fall within the scope of the present invention.

REFERENCE SIGNS LIST

10 Estimating device
11 Input unit
12 Output unit
13 Communication control unit
14 Storage unit
15 Control unit
15a Estimating unit
15b Extracting unit

The invention claimed is:

1. An estimating device comprising:
a memory configured to store computer-readable instructions; and
processing circuitry coupled to the memory and, upon executing the computer-readable instructions, is configured to:
estimate a median of intervals between adjacent data pieces in input time-series data as a uniform interval between adjacent data pieces for the time-series data; and
extract data pieces at the estimated uniform intervals from the input time-series data.

2. The estimating device according to claim 1, wherein the processing circuitry is further configured to extract data pieces at time points reached by going back at the estimated uniform intervals in order from a latest data piece of the time-series data.

3. The estimating device according to claim 1, wherein, assuming that the time point of each data piece of the time-series data is set as a reference point, and when a number of data pieces existing at time points going back or advancing by the estimated uniform intervals from the reference point becomes maximum, the processing circuitry is further configured to extract existing data pieces.

4. The estimating device according to claim 3, wherein when a sum of time periods of data pieces existing with respect to the reference point becomes maximum, the processing circuitry is further configured to extract the existing data pieces.

5. An estimating method executed by an estimating device, the estimating method comprising:
estimating a median of intervals between adjacent data pieces in input time-series data as a uniform interval between adjacent data pieces for the time-series data; and
extracting data pieces at the estimated uniform intervals from the input time-series data.

6. A non-transitory computer-readable recording medium storing therein an estimating program that causes a computer to execute a process comprising:
estimating a median of intervals between adjacent data pieces in input time-series data as a uniform interval between adjacent data pieces for the time-series data; and
extracting data pieces at the estimated uniform intervals from the input time-series data.

7. The estimating device according to claim 1, wherein the processing circuitry is further configured to
extract every interval value in the input time-series data;
estimate the median of intervals as a median of the extracted interval values.

8. The estimating device according to claim 1, wherein the intervals and the uniform interval are expressed in seconds.

* * * * *